Jan. 24, 1933.  F. J. BROWN  1,894,938
PRESSURE WELDING APPARATUS
Filed Sept. 27, 1930   2 Sheets-Sheet 1

Inventor
*Frank J. Brown*
By *Mason Fenwick & Lawrence*
Attorneys

Jan. 24, 1933.  F. J. BROWN  1,894,938
PRESSURE WELDING APPARATUS
Filed Sept. 27, 1930  2 Sheets-Sheet 2
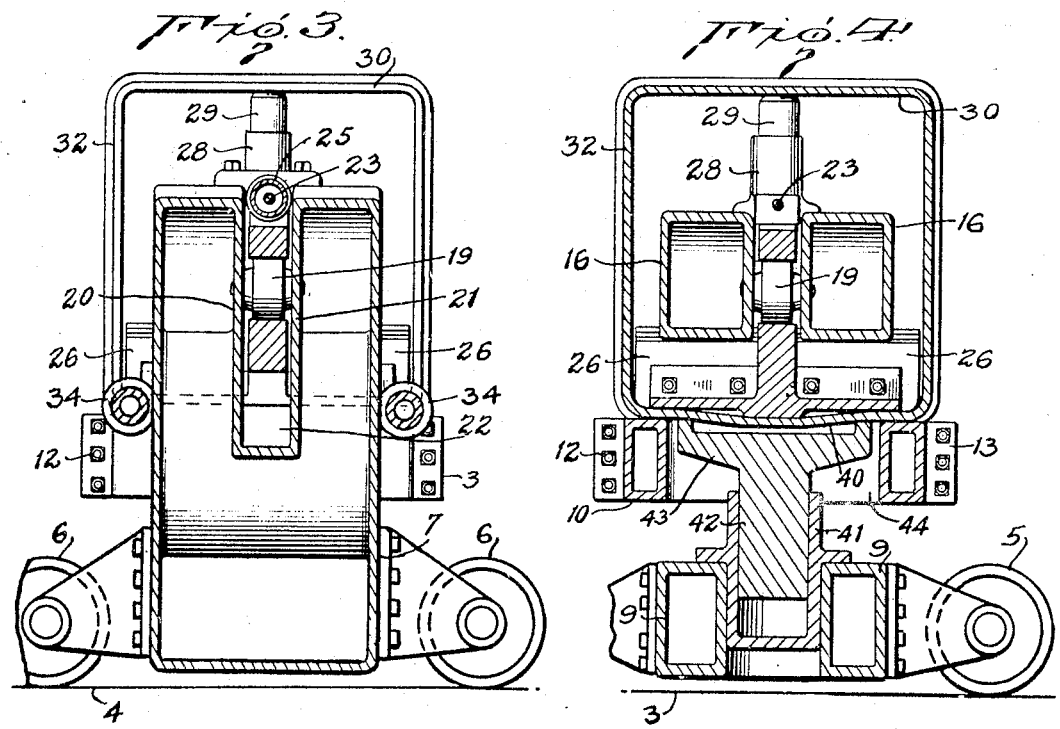
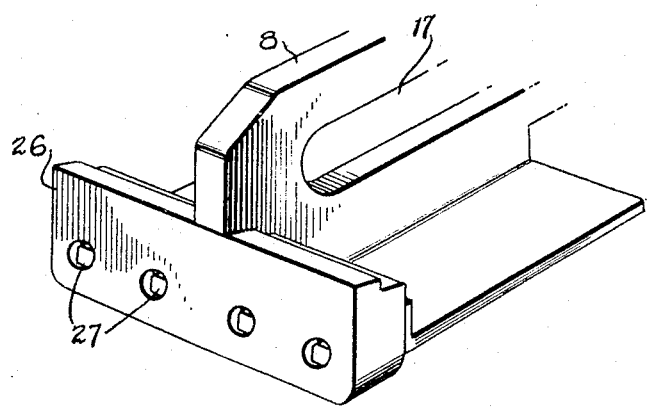
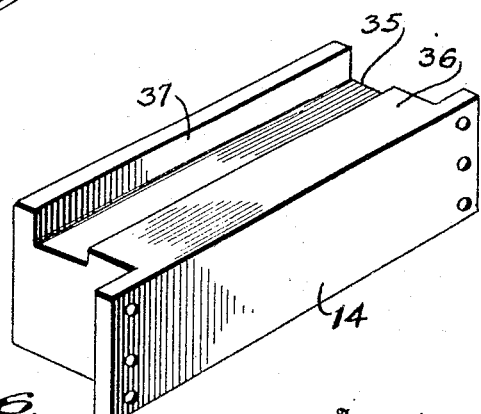
Inventor
*Frank J. Brown*
By *Mason Fenwick Lawrence*
Attorneys Patented Jan. 24, 1933

1,894,938

UNITED STATES PATENT OFFICE

FRANK J. BROWN, OF WASHINGTON, PENNSYLVANIA, ASSIGNOR TO NATIONAL WROUGHT IRON ANNEALING BOX COMPANY, OF WASHINGTON, PENNSYLVANIA, A CORPORATION OF PENNSYLVANIA

PRESSURE WELDING APPARATUS

Application filed September 27, 1930. Serial No. 484,889.

The invention forming the subject matter of this application is a welding process apparatus, particularly designed for use in pressure welding the tops of annealing pots to the shells thereof, and for conveying the pots to be operated upon to a heating furnace, and from the furnace to the pressure welding dies of the apparatus.

The main object of the invention is to arrange the several parts of the apparatus so that these very heavy annealing pots may be mechanically conveyed from one part of the apparatus to another, or others, with the least possible lost motion.

Another object of the invention is to provide apparatus of this character in which several operations may be performed simultaneously upon the annealing pots when the latter are held in a predetermined position in the apparatus.

Other objects of the invention will become apparent as the detailed description thereof proceeds.

In the drawings:

Fig. 3 is a vertical transverse section taken on the line 3—3 of Fig. 2;

Fig. 4 is a vertical transverse section taken on the line 4—4 of Fig. 2;

Fig. 5 is a fragmentary perspective view of a die detachably secured to the other end of a carrier arm forming part of the pressure welding mechanism; and Fig. 6 is a perspective view of an outside die adapted to cooperate with the die shown in Fig. 5 for pressure welding the head of an annealing pot to the shell thereof.

Figure 1:
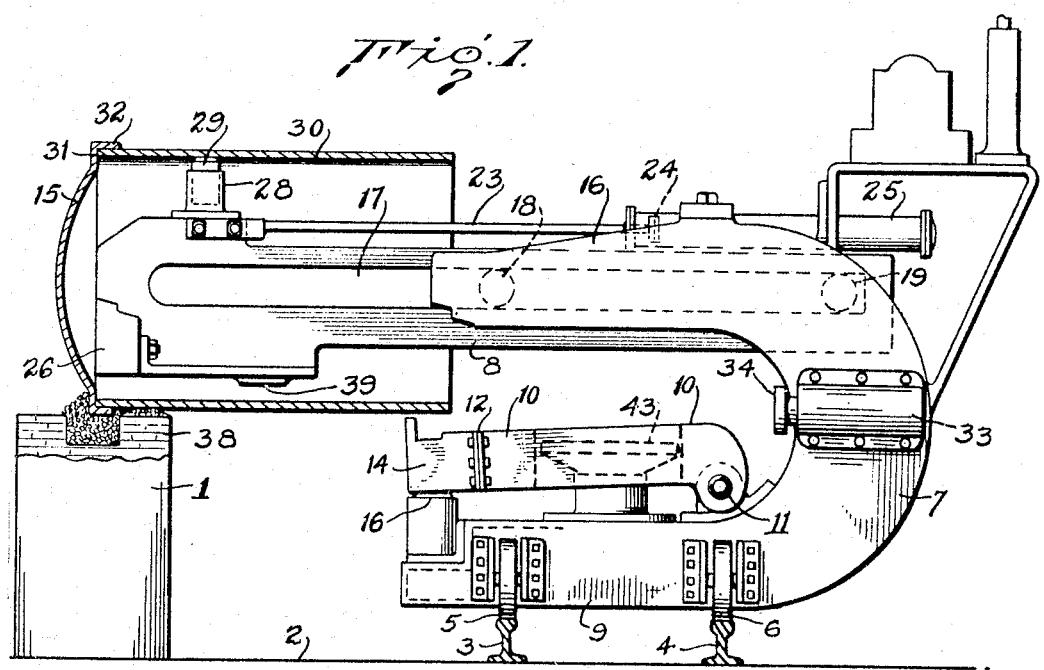
Fig. 1 is a side elevation of the combined heating and pressure welding parts of this apparatus, with an annealing pot shown in cross-section in position when the parts to be welded are subjected to heat as a preliminary to the welding operation.

As shown in Fig. 1 of the drawings, the apparatus involving this invention comprises a heating furnace 1 located in fixed position on a floor 2 upon which is mounted tracks 3 and 4 adapted to receive the wheels 5 and 6 of the frame 7 on which the pressure welding mechanism is mounted. This frame 7 and the tracks on which it is slidably mounted are located at a predetermined distance from the furnace 1, in order to facilitate the positioning of an annealing pot over the furnace and the removal thereof after heating, to a pressure welding position in the frame.

The frame 7 is adapted to be moved bodily along the tracks 3 and 4 to any desired location where an annealing pot, with the parts thereof assembled prior to welding, may be mounted in a predetermined position on a carrier arm 8 which is slidably mounted on the frame 7 and which is adapted to move the annealing pot toward and from the furnace and into pressure welding position after the heating operation. The frame 7 is of the open gap type; and has the lower arm 9 thereof rotatably mounted on the tracks 3 and 4 by means of the wheels 5 and 6 and suitable frame-work, not shown.

The lower arm 9 has a bolster 10 pivotally connected thereto by means of a pivot 11 at one end of said bolster. The other end of the bolster is provided with laterally extending flanges 12 and 13 (see Figures 3 and 4), to which is detachably connected the outer die 14 which is shaped on its upper face to provide for both endwise and lateral welding pressure upon the flanged head 15 of the annealing pot. The welding pressure of the die 14 being secured by means of a hydraulically operated piston 16 mounted in a cylinder at the outer end of the frame 7 immediately beneath the die 14 on the end of the bolster 10.

The carrier arm 8 is mounted to reciprocate horizontally in the upper fixed arm 16 of the frame 7; and for this purpose, is provided with a slot 17, the walls of which are adapted to roll slidably on the rollers 18 and 19 which are pivotally mounted in the opposing walls 20 and 21 of a recess 22 formed in the upper arm of the frame 7. The carrier arm 8 has a piston rod 23 connected to the upper part thereof and near one end, the other end of said rod being connected to a piston 24 which is slidable in the cylinder 25 to be operated in the usual manner by hydraulic or pneumatic pressure.

The carrier arm 8 has its outer end provided with a die 26 adapted to be connected detachably to the end of said arm by bolts 27, or any other suitable means. The upper end of the carrier arm 8 is also provided with a cylinder 28 in which a piston 29 is slidably mounted and is adapted to engage the inner wall 30 of an annealing pot in order to raise or lower the said pot with respect to the arm 8, the piston 29 being operable as usual by hydraulic or pneumatic pressure, applied through conduits not shown.

The annealing pots in common use are usually rectangular in cross-section, with their corners shaped as the quadrant of a cylinder; and the heads of these pots are usually dome-shaped with their outer edges shaped to form a flat portion 31 adapted to seat on the upper edge of the shell 30. The flat portion is commonly bent downwardly to form a flange 32 designed to be welded to the side of the shell 30.

In devices of this character it is essential that the weld between the head and the shell be made as complete as possible. Accordingly, this apparatus is provided with means which not only pressure welds the flange 32 laterally to the shell 30, but also pressure welds the upper edge of the shell to the flat portion 31 of the head 15. In order to effect the lengthwise pressure of the shell 30 against the flat portion 31 of the head 15, the frame 7 is provided with a cylinder 33 in which a piston 34 is adapted to be reciprocated by hydraulic or pneumatic pressure into and out of engagement with the end of the lower side of the shell 30, as shown in Figure 2.

It will be noted from Figure 6 that the outer die 14 is shaped so as to receive the flange 32. The die 14 is provided with a recess 35 equal to the finished depth of the flange 32 at the completion of a welding operation. This means that the face 36 of the die 14 acts as a depth gauge during a welding operation and by contact with the side of the shell 30 to regulate the thickness of the flange 32 in the finished weld. The upwardly projecting face 37 of the die 14 is intended to act as a welding abutment for the flat portion 31 of the head during the welding operation, and resists the lengthwise thrust of the lower side of the shell 30 when operated upon by the piston 34, as shown in Figure 2.

Figure 2:
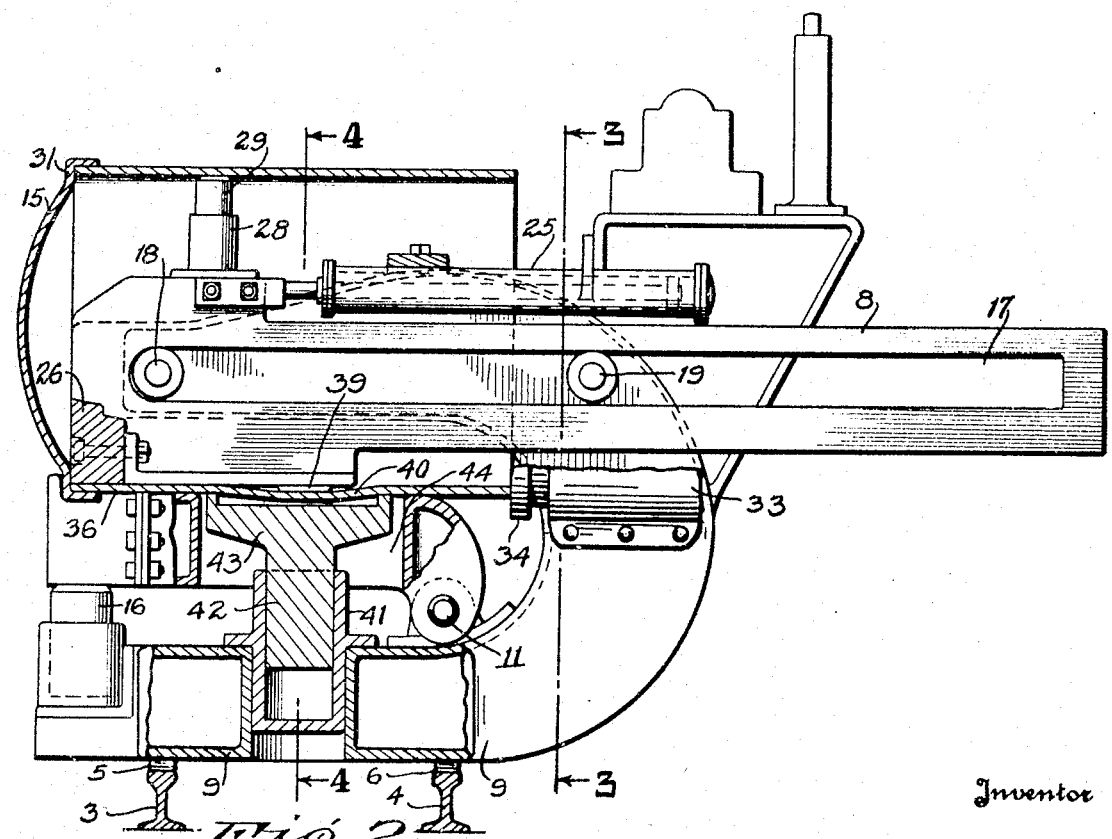
Fig. 2 is a side elevation of the pressure applying part of the apparatus, parts thereof being broken away and shown in section to illustrate their action upon an annealing pot, which is also shown in section in this figure.

As will be apparent from Figures 1 and 2, the die 26 acts as a positioning means for the annealing pot. For example, when the frame 7 is rolled along its tracks 3 and 4 to receive an annealing pot, the parts of which are already assembled, prior to welding, the arm 8 will be thrust forwardly until the front face 26 at the opposite end thereof engages the flat portion 31 on opposite sides of the head 15. And the shell 30 rests on the piston 29 in its retracted position as shown in Figure 1. The frame 7 is then moved on the tracks 3 and 4 until the annealing pot on the arm 8 is located about the burners 38 of the furnace 1, which as previously described is located at the necessary thick distance relative to the tracks 3 and 4 in order to obviate the necessity for any further manipulation of the annealing pot to locate it properly relative to the burners of the furnace 1.

As soon as the heated seam of the annealing pot is in condition for welding, the piston 29 is operated to raise the annealing pot from the furnace. Then, the arm 8 is retracted to the inner limit of its length in order to position the annealing pot with its heated seam in proper position for welding relative to the dies 14 and 26. Immediately upon reaching this position, the bolster 10 is swung about its pivot 11 by operation of the piston 16 against the lower face of the die 14 to force the lower die against the heated seam and into contact with the inner die 26 of the end of the arm 8.

At the same time the piston 34 is forced against the adjacent edge of the shell 30 in order to force the opposite edge of the shell 30 into welding contact with the flat portion 31 of the head 15; and this welding pressure is continued for the necessary length of time to complete the weld. The other sides of the seam are then heated in turn and welded in the same manner.

In carrying out this process, the seams are welded, one at a time; and each side of the seam is completely welded in one operation. It will be noted from Figures 3, 4 and 5, that the inner die 26 extends throughout the length of the seam and that the lower corners of the die are rounded to fit the arcuate corners of the shell. The welding operation on one seam extends throughout the straight length of the seam and through the greater portion of the arcuate parts of each seam. The means for simultaneously welding the straight and arcuate portion of the seam is fully disclosed and claimed in my co-pending application, Serial Number 475,061, filed August 13, 1930, for improvement in pressure welding machine.

The present invention, while utilizing the pressure welding mechanism, described in my said application, relates particularly to the means for conveying the heavy annealing pots toward and from the heating furnace and into and out of welding position in the apparatus.

In the manufacture of these annealing pots, it is common to bulge the sides of their shells outwardly in order to prevent any inward bucking of the said sides during the heating thereof in the annealing furnaces. While this operation of bulging may be said to be independent of the welding of the head to the shell of an annealing pot, the present welding apparatus is peculiarly adapted to perform the bulging operation simultaneously with the welding, because, while the annealing pot is held in a predetermined position during the welding operation, the bulging operation can be performed while it is so held.

In order to provide for the bulging of the sides of the annealing pot, the lower edge of the carrier arm 8 is provided with a projection 39 at the desired position or distance from the front face of the die 26 to form the bulge 40 on the lower side of the shell. The lower part of the frame 7 is provided with a cylinder 41 in which a piston 42 reciprocates by hydraulic or pneumatic pressure toward and from the adjacent side of the shell while the latter is held in a welding position as shown in Figure 2. The upper part of the piston 42 is expanded to form a head 43 which is recessed on its upper face in order to permit the projection 39 to force part of the shell 30 into said recess and form the bulge 40. The bolster 10 is provided with a central opening 44 sufficiently large to permit the head 43 to reciprocate therein without binding.

While the apparatus, so far described, relates to welding mechanism particularly, in its broadest aspect the invention is concerned with mechanism designed particularly to manipulate mechanically these very heavy articles of manufacture and to move these articles into and from different predetermined relatively fixed positions in order that a number of necessary operations may be simultaneously performed thereon in their various positions.

While I have shown this apparatus as embodied in a specific form, it must be understood that the invention is not to be in any way limited to this form or to any other form except as may be imposed thereon by the scope of the claims appended hereto.

What I claim is:

1. A pressure welding machine comprising an open gap frame having upper and lower substantially horizontal supports, an arm mounted to slide lengthwise on the upper support and past the end of the lower support and having a die at one end thereof, a bolster pivoted at one end on the lower support and having a die at the free end thereof, and means for swinging said bolster toward said arm.

2. A pressure welding machine comprising an open gap frame having upper and lower substantially horizontal supports, an arm mounted to slide lengthwise on the upper support and past the end of the lower support, a die detachably secured to one end of said arm, a bolster pivoted at one end of the lower support, a die detachably secured to the free end of said bolster, and means for swinging said bolster toward said arm.

3. A pressure welding machine comprising an open gap frame having upper and lower substantially horizontal supports, an arm mounted to slide lengthwise on the upper support and past the end of the lower support, means for moving said arm on said upper support, a die detachably secured to one end of said arm, a bolster pivoted at one end on the lower support, a die detachably secured to the free end of said bolster, means engaging the lower face of the last named die to swing said bolster toward said arm.

4. A pressure welding machine comprising an open gap frame having upper and lower substantially horizontal supports, a die, means for supporting said die to slide horizontally on the upper support and past the end of the lower support, a second die, means for pivotally connecting the second die to the lower support, and means on the lower support for moving the second die toward the first named die.

5. Pressure welding apparatus comprising an open gap frame having substantially horizontal upper and lower supports, an arm mounted to slide substantially horizontally on the upper support, a bolster pivoted on the lower support and having its upper face shaped to form a supporting table, dies secured to the adjacent ends of said arm and bolster, means for moving the bolster toward said arm and a piston reciprocable on said frame substantially horizontally in line with the upper face of said bolster.

6. Pressure welding apparatus comprising an open gap frame having substantially horizontal upper and lower supports, an arm mounted to slide substantially horizontally on the upper support, a bolster having one end thereof pivoted to the lower support and having its upper face adapted to form a table for an article to be operated upon, dies detachably secured to the adjacent ends of said bolster and support, and cooperating means on said arm and the lower support for forming a bulge in the face of an article held in welding position between said dies.

7. Pressure welding apparatus comprising an open gap frame having substantially horizontal upper and lower supports, rollers journaled in said upper support, an arm slidably mounted on said rollers, means for reciprocating said arm on said rollers, a bolster having one end thereof pivoted to the lower support, means for swinging said bolster about its pivot, dies detachably connected to the adjacent ends of said bolster and arm, said bolster being provided with an aperture therethrough and means on the lower support and having a part reciprocable in said aperture into and out of pressure contact with an article held between said arm and bolster.

8. Pressure welding apparatus comprising an open gap frame having substantially horizontal upper and lower supports, an arm mounted to slide horizontally on the upper support, a die detachably secured to one end of said arm and flush with the lower side thereof, means on the upper side of said arm adapted to engage the inner surface of one side of an annealing pot and adjustable to force the inner surface of the opposite side of said pot into contact with the lower side of said arm and die, a die pivoted to the lower support and means for moving the last named die into pressure welding contact with the adjacent corner of an annealing pot supported by said arm.

9. Pressure welding apparatus comprising an open gap frame having substantially horizontal upper and lower supports, an arm mounted to slide horizontally on the upper support, means for reciprocating said arm on the upper support, a die secured to one end of said arm and flush with the lower side thereof, means on the upper side of said arm to engage the inner surface of one side of an annealing pot, and adjustable to force the inner surface of the opposite side of said pot into contact with the lower end of said arm and die, a bolster pivoted to the lower support, a die detachably connected to the free end of said bolster, and means for moving said bolster and die into contact with the lower seam of an annealing pot supported by said arm.

10. Pressure welding apparatus comprising an open gap frame having substantially horizontal upper and lower supports, an arm mounted to slide horizontally on the upper support, means for reciprocating said arm on the upper support, a die secured to one end of said arm and flush with the lower side thereof, means on the upper side of said arm to engage the inner surface of one side of an annealing pot and adjustable to force the inner surface of the opposite side of said pot into contact with the lower end of said arm and die, a bolster pivoted to the lower support, a die detachably connected to the free end of said bolster, means to force the last named die into pressure welding contact with the lower seam of said pot, and means for bulging the lower side of said pot while the pot is held between said dies.

In testimony whereof I affix my signature.

FRANK J. BROWN.